United States Patent
Truong et al.

(10) Patent No.: US 8,305,053 B2
(45) Date of Patent: Nov. 6, 2012

(54) SYSTEM AND METHOD FOR CONTROLLING A POWER SWITCH IN A POWER SUPPLY SYSTEM

(75) Inventors: Tom C. Truong, Lewisville, TX (US); Stefan Wiktor, Raleigh, NC (US)

(73) Assignee: Texas Instruments Incorporated, Dallas, TX (US)

( * ) Notice: Subject to any disclaimer, the term of this patent is extended or adjusted under 35 U.S.C. 154(b) by 279 days.

(21) Appl. No.: 12/858,984

(22) Filed: Aug. 18, 2010

(65) Prior Publication Data

US 2012/0043950 A1 Feb. 23, 2012

(51) Int. Cl.
G05F 1/618 (2006.01)
H03K 5/12 (2006.01)
(52) U.S. Cl. .......................... 323/224; 323/284; 327/170
(58) Field of Classification Search .................. 323/223, 323/224, 282, 283, 284, 351; 363/39; 327/170
See application file for complete search history.

(56) References Cited

U.S. PATENT DOCUMENTS

| | | | | |
|---|---|---|---|---|
| 5,469,096 A | * | 11/1995 | Nessi et al. | 327/112 |
| 7,696,808 B2 | * | 4/2010 | Wong et al. | 327/384 |
| 7,786,778 B1 | * | 8/2010 | Mannoorittathu et al. | 327/170 |
| 8,169,209 B2 | * | 5/2012 | Chen et al. | 323/289 |

* cited by examiner

*Primary Examiner* — Gary L Laxton
(74) *Attorney, Agent, or Firm* — William B. Kempler; Wade J. Brady, III; Frederick J. Telecky, Jr.

(57) ABSTRACT

One embodiment of the invention includes a power supply system. The system includes at least one power switch configured to be activated and deactivated based on a duty-cycle of a respective at least one control signal to generate an output voltage. The system also includes a gate driver configured to generate the at least one control signal and to adjust a slew-rate of each pulse of the at least one control signal to substantially mitigate amplitude ringing at a switching node during a first rising-edge portion and to substantially mitigate conduction losses associated with the at least one power switch during activation and deactivation of the at least one power switch during a second rising-edge portion.

20 Claims, 4 Drawing Sheets

SYSTEM AND METHOD FOR CONTROLLING A POWER SWITCH IN A POWER SUPPLY SYSTEM

TECHNICAL FIELD

The invention relates generally to electronic circuits and, more specifically, to a system and method for controlling a power switch in a power supply system.

BACKGROUND

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices so that the battery life is extended. One such type of regulator is known as a switching regulator or switching power supply, which controls the flow of power to a load by controlling the on and off duty-cycle of one or more power switches coupled to the load. Switching regulators have been implemented as an efficient mechanism for providing a regulated output in power supplies. However, switching regulators can be subject to amplitude ringing associated with a switching node coupled to the output, as well as conduction losses associated with a resistance of the power switch(es) when activated. Such phenomena can decrease efficiency of the switching regulator.

SUMMARY

One embodiment of the invention includes a power supply system. The system includes at least one power switch configured to be activated and deactivated based on a duty-cycle of a respective at least one control signal to generate an output voltage. The system also includes a gate driver configured to generate the at least one control signal and to adjust a slew-rate of each pulse of the at least one control signal to substantially mitigate amplitude ringing at a switching node during a first rising-edge portion and to substantially mitigate conduction losses associated with the at least one power switch during activation and deactivation of the at least one power switch during a second rising-edge portion.

Another embodiment of the invention includes a method for activating a power switch in a power supply system. The method includes switching a pulse-width modulation (PWM) signal from a first state to a second state and increasing a magnitude of a control signal associated with the power switch from zero volts to a threshold voltage associated with the power switch at a first slew-rate in response to the PWM signal switching to the second state. The method also includes monitoring the magnitude of the control signal and increasing the magnitude of the control signal from approximately the threshold voltage to a maximum magnitude at a second slew-rate that is greater than the first slew-rate in response to the magnitude of the control signal being approximately equal to the threshold voltage.

Yet another embodiment of the invention includes a power supply system. The system includes a high-side power switch interconnecting an input voltage and a switching node and a low-side power switch interconnecting the switching node and a low voltage rail. The system also includes a gate driver configured to generate a high-side control signal configured to activate and deactivate the high-side switch and a low-side control signal configured to activate and deactivate the low-side switch in response to a PWM signal to generate an output voltage. The gate driver is also configured to adjust a dead-time between deactivation of one of the high-side and low-side power switches and activation of the other of the high-side and low-side power switches based on a detected slew-rate of deactivation of the one of the high-side and low-side power switches.

DETAILED DESCRIPTION

Figure 1:
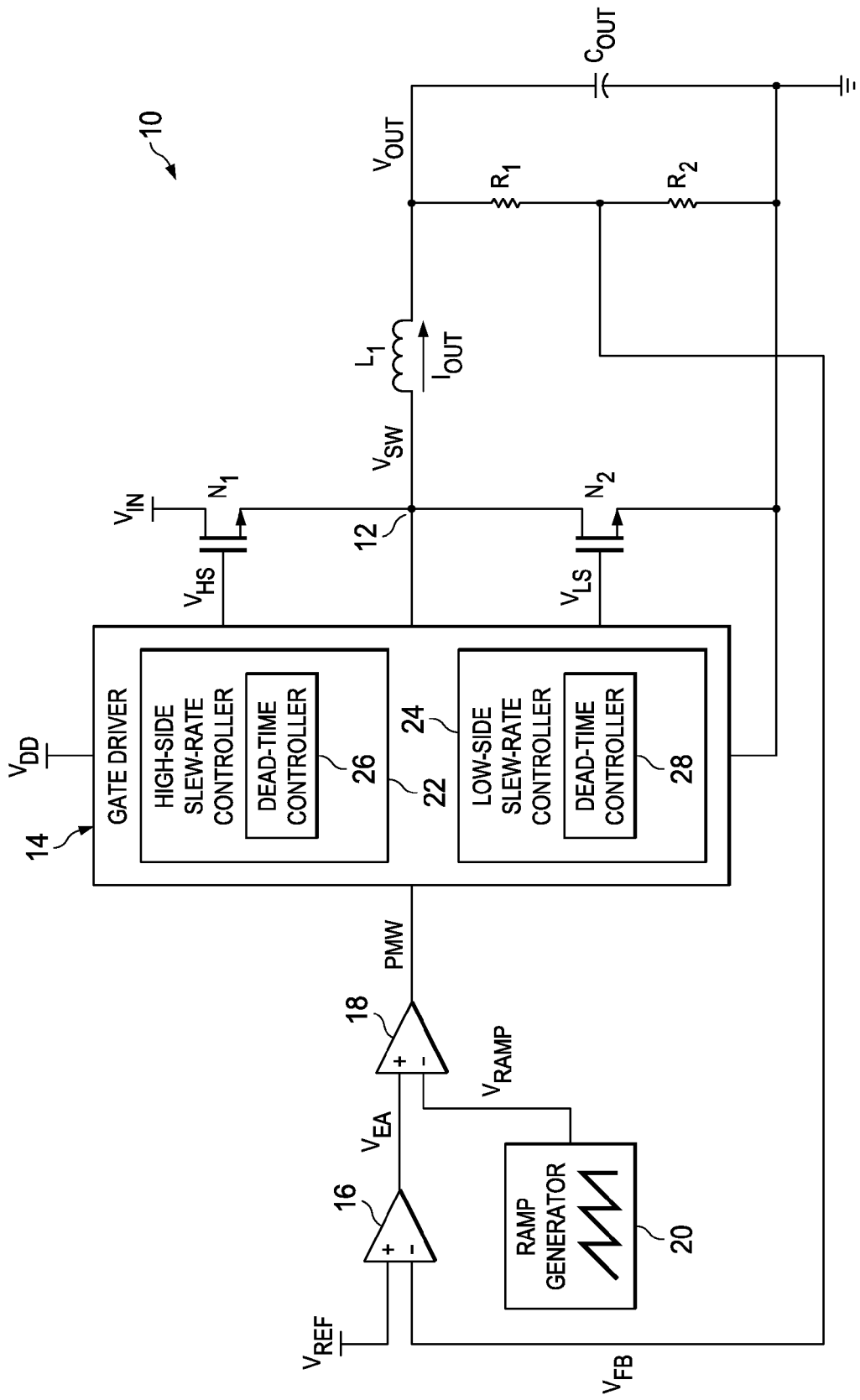
FIG. 1 illustrates an example of a power supply system in accordance with an aspect of the invention.

The invention relates generally to electronic circuits and, more specifically, to a system and method for controlling a power switch in a power supply system. The power supply system includes a gate driver that generates at least one control signal for controlling at least one power switch based on a pulse-width modulation (PWM) signal. Thus, the at least one control signal activates and deactivates the at least one power switch based on a switching duty-cycle.

The gate driver also includes at least one slew-rate controller that is configured to adjust a slew-rate of a rising-edge of each pulse of the at least one control signal. As an example, the slew-rate controller can monitor a magnitude of the voltage of the at least one control signal. The slew-rate controller can thus increase the voltage of the control signal from approximately zero volts to approximately the threshold voltage of the power switch at a first slew-rate. Then, upon detecting that the control signal has a voltage magnitude that is approximately equal to the threshold voltage of the power switch, the slew-rate controller can increase the voltage of the control signal from approximately the threshold voltage to a maximum value at a second slew-rate that is greater than the first slew-rate.

As an example, the gate driver can be configured to generate a high-side control signal to control a high-side power switch and a low-side control signal to control a low-side power switch. The high-side and low-side slew-rate controllers can include respective dead-time controllers that are configured to adjust a dead-time between deactivation of one of the high-side and low-side power switches and the activation of the other of the high-side and low-side power switches. Specifically, the dead-time controllers can detect the slew-rate of the falling-edge of the high-side and low-side control signals, and can set selectively enable time delay elements to delay activation of the other of the high-side and low-side power switches based on the detected slew-rate to minimize the dead-time.

Based on the adjustable rising-edge slew-rates of the high-side and low-side control signals, and based on the adjustable dead-times between activation of the high-side and low-side power switches, the power supply system can operate more efficiently than typical power supply systems. Specifically, by increasing the voltage of the high-side and low-side control signals at a more gradual slew-rate from approximately zero volts to approximately a threshold voltage of the respective high-side and low-side power switches, the power supply system can substantially mitigate amplitude ringing at an associated switching node between the high-side and low-side power switches. In addition, by increasing the voltage of the high-side and low-side control signals at a more rapid slew-rate from approximately the threshold voltage to a maximum magnitude, the power supply system can substantially mitigate conduction losses in the activation of the high-side and low-side power switches. Furthermore, by minimizing the dead-time between deactivation of one of the high-side and low-side power switches and the activation of the other of the high-side and low-side power switches, the power supply system can provide an output voltage with optimal switching efficiency while substantially mitigating shoot-through conditions.

FIG. 1 illustrates a power supply system 10 in accordance with an aspect of the invention. The power supply system 10 is configured as a buck-converter that includes a high-side power switch $N_1$ that is coupled to an input voltage $V_{IN}$ and a low-side power switch $N_2$ that is coupled to a low voltage rail, demonstrated as ground in the example of FIG. 1. The power switches $N_1$ and $N_2$ can be configured as any of a variety of field effect transistor (FET) devices. The power switches $N_1$ and $N_2$ are separated from each other by a switching node 12 having a voltage $V_{SW}$. The power supply system 10 can be implemented in a variety of electronic applications, such as computer systems and/or communications devices.

The power supply system 10 includes a gate driver 14 that receives a power voltage $V_{DD}$ and is configured to generate a high-side control signal $V_{HS}$ and a low-side control signal $V_{LS}$ based on a pulse width modulation (PWM) signal, demonstrated as a signal "PWM", to activate and deactivate the respective power switches $N_1$ and $N_2$. Specifically, based on the signal PWM, the control signals $V_{HS}$ and $V_{LS}$ can each have a duty-cycle that alternately controls the power switches $N_1$ and $N_2$. The switching of the power switches $N_1$ and $N_2$ thus induces a current $I_{OUT}$ through an inductor $L_1$, which results in an output voltage $V_{OUT}$ across an output capacitor $C_{OUT}$. It is to be understood that the voltage magnitude of the high-side control signal $V_{HS}$ can be referenced to the voltage $V_{SW}$ at the switching node 12, and the low-side control signal $V_{LS}$ can be referenced to ground.

In addition, the power supply system 10 includes a pair of feedback resistors $R_1$ and $R_2$ arranged as a voltage-divider that generate a feedback voltage $V_{FB}$ based on the output voltage $V_{OUT}$. The feedback voltage $V_{FB}$ is provided to an error amplifier 16 that generates an error voltage $V_{EA}$ based on a comparison of the feedback voltage $V_{FB}$ with a reference voltage $V_{REF}$. The power supply system 10 further includes a comparator 18 that receives a ramp signal $V_{RAMP}$ that is generated by a ramp generator 20 at an inverting input and the error voltage $V_{EA}$ at a non-inverting input. The comparator 18 thus generates the signal PWM based on a comparison of the error voltage $V_{EA}$ and the ramp signal $V_{RAMP}$.

The power supply system 10 can be subject to a variety of effects that can degrade the operating efficiency in generating the output voltage $V_{OUT}$. As one example, rapid activation of the power switches $N_1$ and $N_2$ can result in amplitude ringing (i.e., damped oscillation) of the voltage $V_{SW}$ at the switching node 12. As another example, a more gradual activation of the power switches $N_1$ and $N_2$ can result in conduction losses stemming from an increased "on"-resistance of the high-side and low-side power switches $N_1$ and $N_2$. Furthermore, to substantially mitigate a shoot-through condition in which a current path exists from the input voltage $V_{IN}$ to ground through both of the power switches $N_1$ and $N_2$, the gate driver 14 inserts a dead-time between deactivation of one of the power switches $N_1$ and $N_2$ and activation of the other of the power switches $N_1$ and $N_2$. However, an excessive dead-time can result in lower efficiency in generating the output voltage $V_{OUT}$ due to the additional power drain on the inductor $L_1$ while both the power switches $N_1$ and $N_2$ are deactivated.

To maintain greater efficiency of the power supply system 10, the gate driver 14 includes a high-side slew-rate controller 22 and a low-side slew-rate controller 24. Each of the slew-rate controllers 22 and 24 are configured to adjust the slew-rate of the rising-edge of each of the control signals $V_{HS}$ and $V_{LS}$, respectively. As an example, the slew-rate controllers 22 and 24 can be configured to monitor a magnitude of the control signals $V_{HS}$ and $V_{LS}$. The slew-rate controllers 22 and 24 can increase each of the control signals $V_{HS}$ and $V_{LS}$ at an initial, more gradual slew-rate from approximately zero volts to a magnitude that is approximately equal to a threshold voltage of the respective power switches $N_1$ and $N_2$. Therefore, the gate driver 14 can substantially mitigate amplitude ringing of the voltage $V_{SW}$ in the switching node 12. Upon detecting that the amplitude of the control signals $V_{HS}$ and $V_{LS}$ is approximately equal to the threshold voltage, the slew-rate controllers 22 and 24 can then substantially increase the slew-rate of the respective control signals $V_{HS}$ and $V_{LS}$ to a maximum value. Therefore, the gate driver 14 can also substantially mitigate conduction losses in the power supply system 10.

Figure 2:
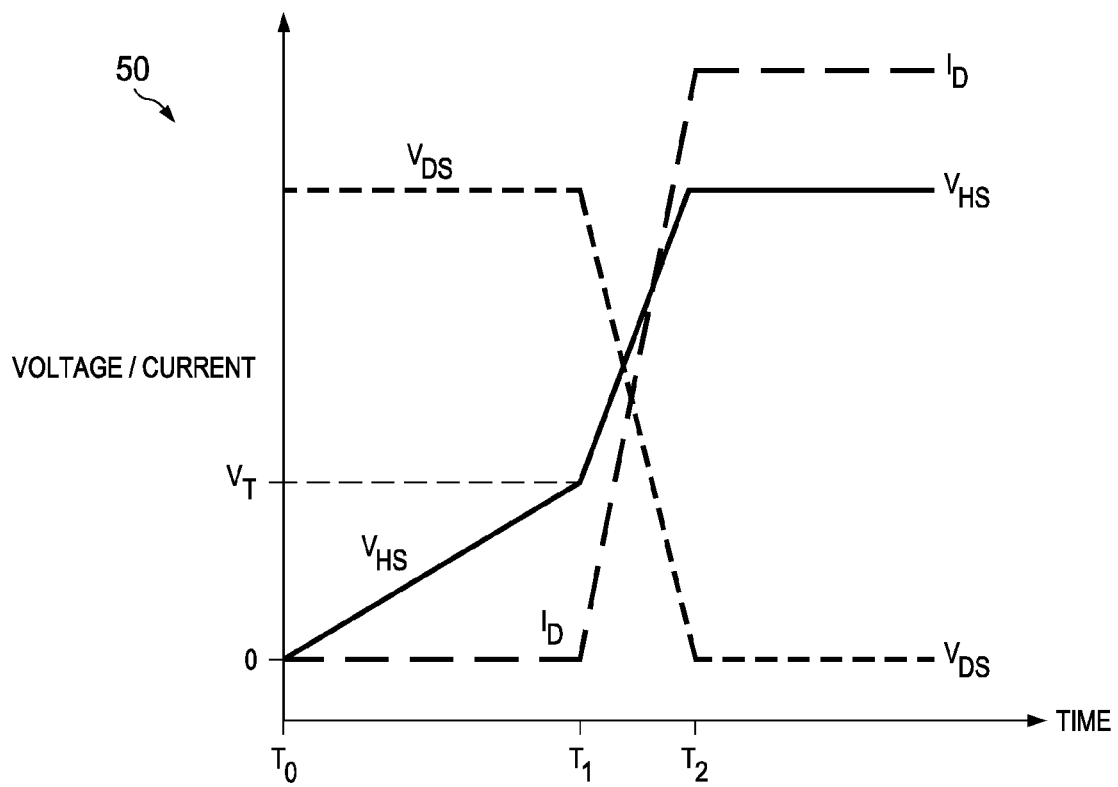
FIG. 2 illustrates an example of a graph of voltage and current in accordance with an aspect of the invention.

FIG. 2 illustrates an example of a graph 50 of voltage and current in accordance with an aspect of the invention. Specifically, the graph 50 demonstrates changes in voltage magnitude of the high-side control signal $V_{HS}$, and thus the gate-source voltage $V_{GS}$ of the high-side power switch $N_1$. The graph 50 also demonstrates changes in magnitude of the drain-source voltage $V_{DS}$ of the high-side power switch $N_1$, as well as changes in magnitude of a drain current $I_D$ through the high-side power switch $N_1$. It is to be understood that, although the example of FIG. 2 demonstrates voltage characteristics of the high-side power switch $N_1$, the following discussion of the example of FIG. 2 can apply equally with respect to voltage characteristics of the low-side power switch $N_2$.

At a time $T_0$, the gate driver 14 commands activation of the high-side power switch $N_1$, such as in response to a change in state of the signal PWM. Thus, the high-side slew-rate controller 22 begins to increase the magnitude of the high-side control signal $V_{HS}$ at a first, more gradual slew-rate. At a time $T_1$, the magnitude of the high-side control signal $V_{HS}$ becomes approximately equal to a magnitude of a threshold voltage $V_T$ of the high-side power switch $N_1$. Thus, also at the time $T_1$, the high-side power switch $N_1$ becomes activated. As a result, the drain-source voltage $V_{DS}$ begins to decrease and the drain current $I_D$ begins to increase. Based on the activation of the high-side power switch $N_1$ at the gradual slew-rate, amplitude ringing of the voltage $V_{SW}$ at the switching node 12 is substantially mitigated.

Because the high-side slew-rate controller 22 monitors the magnitude of the high-side control signal $V_{HS}$, at approximately the time $T_1$, the high-side slew-rate controller 22 detects that the high-side control voltage $V_{HS}$ is approximately equal to the threshold voltage $V_T$. Therefore, beginning at the time $T_1$, the high-side slew-rate controller 22 increases the slew-rate of the high-side control signal $V_{HS}$ to a more rapid increase in magnitude. Accordingly, based on the more rapid increase in the slew-rate of the high-side control signal $V_{HS}$, conduction losses of the drain current $I_D$ through the high-side power switch $N_1$ are substantially mitigated.

At a time $T_2$, the high-side control signal $V_{HS}$ achieves a maximum magnitude, which can be a voltage magnitude that is approximately equal to or greater than a gate-source voltage $V_{GS}$ that is sufficient to fully activate the high-side power switch $N_1$. Therefore, at the time $T_2$, the drain-source voltage $V_{DS}$ has decreased to a magnitude of approximately zero and the drain current $I_D$ through the high-side power switch $N_1$ has achieved a maximum magnitude.

It is to be understood that the magnitudes of the high-side control signal $V_{HS}$, the drain-source voltage $V_{DS}$, and the drain current $I_D$ are demonstrated in the example of FIG. 2 as diagrammatically. As an example, the high-side control signal $V_{HS}$, the drain-source voltage $V_{DS}$, and the drain current $I_D$ are not intended to be demonstrated exactly relative to each other, but are instead demonstrated at arbitrary magnitudes relative to themselves and to zero. In addition, the slew-rates demonstrated in each of the high-side control signal $V_{HS}$, the drain-source voltage $V_{DS}$, and the drain current $I_D$ are likewise not intended to be limited to the slew-rates demonstrated in the example of FIG. 2, but can instead have different slopes, can be non-linear, and can achieve respective minimum and maximum values at different times relative to each other.

Referring back to the example of FIG. 1, the high-side slew-rate controller 22 includes a dead-time controller 26 and the low-side slew-rate controller 24 includes a dead-time controller 28. The dead-time controller 26 is configured to adjust a duration of a dead-time between deactivation of the high-side power switch $N_1$ and activation of the low-side power switch $N_2$ based on detecting a falling-edge slew-rate of the high-side control signal $V_{HS}$ (falling-edge not shown in FIG. 2). Similarly, the dead-time controller 28 is configured to adjust a duration of a dead-time between deactivation of the low-side power switch $N_2$ and activation of the high-side power switch $N_1$ based on detecting a falling-edge slew-rate of the low-side control signal $V_{LS}$. Therefore, the dead-time controllers 26 and 28 can substantially minimize the dead-time between activation and deactivation of the high-side and low-side power switches $N_1$ and $N_2$ to provide for greater efficiency in generating the output voltage $V_{OUT}$.

It is to be understood that the power supply system 10 is not intended to be limited to the example of FIG. 1. As an example, the power supply system 10 could include additional power supply circuit components, such as additional circuitry for soft-starting, a freewheeling diode in parallel with the low-side power switch $N_2$, or any of a variety of other additional circuit components. As another example, the gate driver 14 is not limited to generating high-side and low-side control signals $V_{HS}$ and $V_{LS}$ for respective high-side and low-side power switches $N_1$ and $N_2$ in a buck converter topology, but could instead control a slew-rate of a single control signal for a single power switch in a different power converter topology, such as a boost converter. Thus, the power supply system 10 can be configured in a variety of ways.

Figure 3:
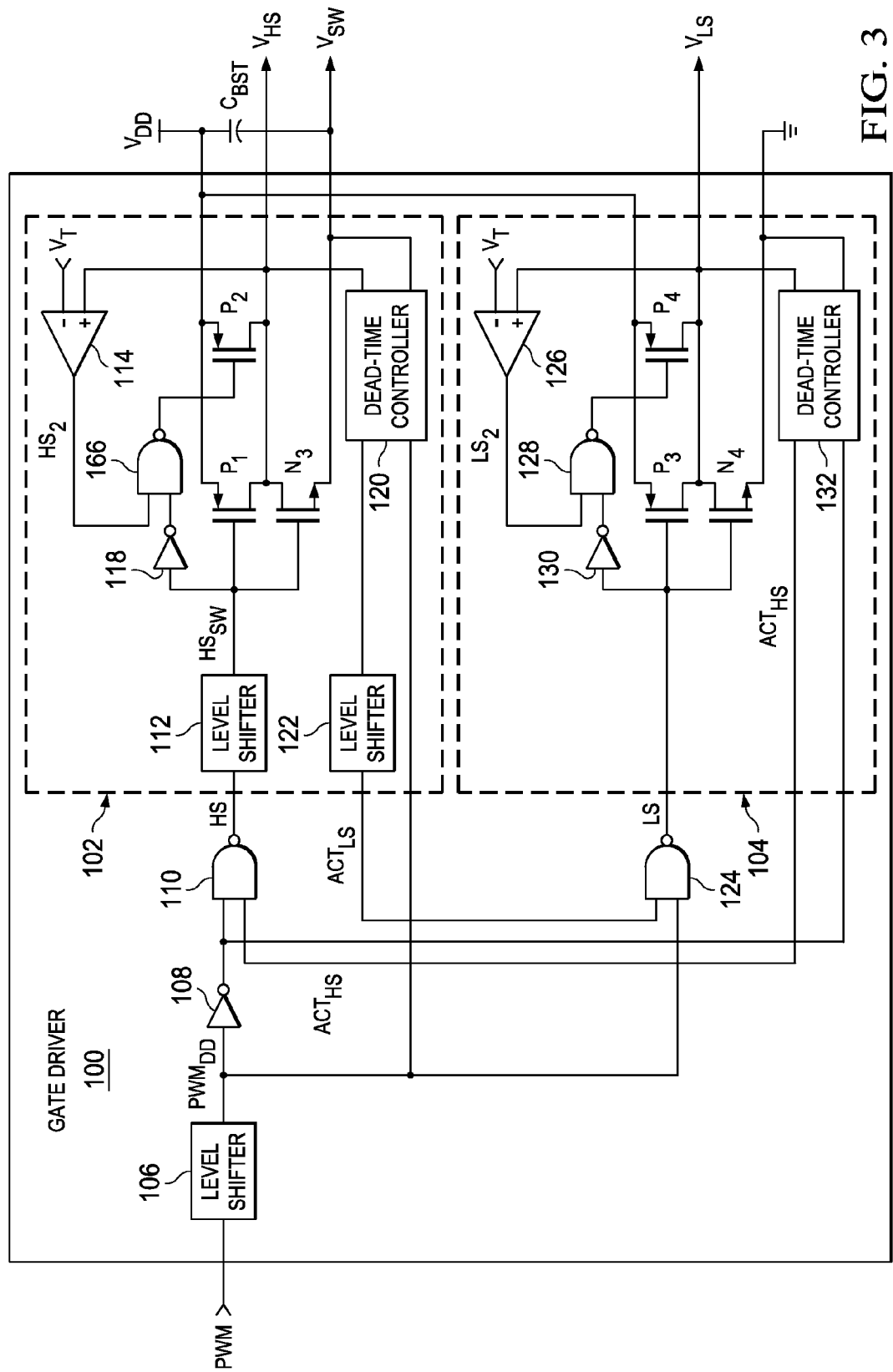
FIG. 3 illustrates an example of a gate driver in accordance with an aspect of the invention.

FIG. 3 illustrates an example of a gate driver 100 in accordance with an aspect of the invention. The gate driver 100 can be configured as or as a portion of an integrated circuit (IC). As an example, the gate driver 100 can correspond to the gate driver 14 in the example of FIG. 1. Therefore, reference is to be made to the example of FIG. 1 in the following description of the example of FIG. 3.

The gate driver 100 includes a high-side slew-rate controller 102 and a low-side slew-rate controller 104, which can correspond to the slew-rate controllers 22 and 24 in the example of FIG. 2. The gate driver 100 also includes a level shifter 106 that receives the signal PWM from the comparator 18 and level-shifts the magnitude of the signal PWM to reference the signal PWM to the power voltage $V_{DD}$, thus generating a signal $PWM_{DD}$. The signal $PWM_{DD}$ is then inverted via an inverter 108, and the inverted signal $PWM_{DD}$ is provided to a NAND-gate 110, along with a signal $ACT_{HS}$. The signal $ACT_{HS}$ is an activation signal provided by the low-side slew-rate controller 104, as described in greater detail below. The NAND-gate 110 thus generates a signal HS that is logic-low to signify activation of the high-side power switch $N_1$ (not shown in the example of FIG. 3) when the inverted signal $PWM_{DD}$ and the activation signal $ACT_{HS}$ each have a logic-high state.

The signal HS is provided to a level-shifter 112 in the high-side slew-rate controller 102 that generates a signal $HS_{SW}$ that corresponds to the signal HS referenced between the power voltage $V_{DD}$ and the voltage $V_{SW}$ at the switching node 12. In the example of FIG. 3, the power voltage $V_{DD}$ and the voltage $V_{SW}$ are demonstrated as being interconnected by a boost capacitor $C_{BST}$. When the signal $HS_{SW}$ has a logic-low state, the signal $HS_{SW}$ activates a first P-type switch $P_1$ that couples the high-side control signal $V_{HS}$ to the power voltage $V_{DD}$, thus allowing the voltage magnitude of the high-side control signal $V_{HS}$ to increase. Based on the characteristics of the first switch $P_1$, the increase of the voltage magnitude of the high-side control signal $V_{HS}$ can be at an initial, more gradual slew-rate, such as the slew-rate between the times $T_0$ and $T_1$ in the example of FIG. 2.

The high-side slew-rate controller 102 also includes a comparator 114 that is configured to monitor the magnitude of the high-side control signal $V_{HS}$. Specifically, the comparator 114 receives the high-side control signal $V_{HS}$ at a non-inverting input and receives a threshold voltage $V_T$ at an inverting input. The threshold voltage $V_T$ can correspond to the activation threshold voltage of the high-side power switch $N_1$. For example, the threshold voltage $V_T$ can be set based on known threshold voltage characteristics of the high-side power switch $N_1$. Thus, upon the high-side control signal $V_{HS}$ having a magnitude that is approximately equal to or greater than the threshold voltage $V_T$, the comparator 114 provides a signal $HS_2$ at a logic-high state to a NAND-gate 116. An inverter 118 inverts the signal $HS_{SW}$ to provide an inverted version of the signal $HS_{SW}$ to the NAND-gate 116. Therefore, when the high-side control signal $V_{HS}$ has a magnitude that is approximately equal to or greater than the threshold voltage $V_T$, the NAND-gate 116 activates a second P-type switch $P_2$ that is arranged in parallel with the first switch $P_1$. As a result, the high-side control signal $V_{HS}$ becomes coupled to the power voltage $V_{DD}$ through both of the first and second switches $P_1$ and $P_2$ to increase the voltage magnitude of the high-side control signal $V_{HS}$ at the more rapid slew-rate, such as between the times $T_1$ and $T_2$ in the example of FIG. 2. Accordingly, the high-side slew-rate controller 102 adjusts the slew-rate of the rising-edge of the high-side control signal $V_{HS}$ to substantially mitigate both amplitude ringing of the voltage $V_{SW}$ and conduction losses through the high-side power switch $N_1$, as described above.

Upon the signal HS switching from a logic-low state to a logic-high state, such as in response to the signal PWM switching states, the signal $HS_{SW}$ deactivates the first switch $P_1$ and deactivates the second switch $P_2$ via the inverter 118 and the NAND-gate 116. The signal $HS_{SW}$ also activates a third N-type switch $N_3$ to couple the high-side control signal $V_{HS}$ to the voltage $V_{SW}$ at the switching node 12. As a result, the voltage magnitude of the high-side control signal $V_{HS}$ decreases to deactivate the high-side power switch $N_1$. Thus, the low-side power switch $N_2$ (not shown in the example of FIG. 3) can be activated.

In the example of FIG. 3, the high-side slew-rate controller 102 includes a dead-time controller 120. The dead-time controller 102 receives the signal $PWM_{DD}$ and the voltage $V_{SW}$ and is configured to detect the falling-edge slew-rate of the high-side control signal $V_{HS}$ and to generate an activation signal $ACT_{LS}$ via a level-shifter 122. The level-shifter 122 level-shifts the magnitude of the activation signal $ACT_{LS}$ down to being referenced from the power voltage $V_{DD}$ to ground. The dead-time controller 120 thus controls the dead-time between deactivation of the high-side power switch $N_1$ and activation of the low-side power switch $N_2$ by selectively delaying activation of the low-side power switch $N_2$ via the activation signal $ACT_1$ based on the detected falling-edge slew-rate of the high-side control signal $V_{HS}$. As an example, the dead-time controller 120 can selectively enable one or more time delay elements in generating the activation signal $ACT_{LS}$ based on the detected falling-edge slew-rate of the high-side control signal $V_{HS}$. As a result, the gate driver 100 can provide optimal efficiency in switching between the high-side and low-side power switches $N_1$ and $N_2$ while substantially mitigating shoot-through from the input voltage $V_{IN}$ to ground via the power switches $N_1$ and $N_2$.

The activation signal $ACT_{LS}$ and the signal $PWM_{DD}$ are each provided to a NAND-gate 124. Thus, the NAND-gate 124 generates a signal LS that is logic-low to signify activation of the low-side power switch $N_2$ when the signal $PWM_{DD}$ and the activation signal $ACT_{LS}$ each have a logic-high state. In the example of FIG. 3, the low-side slew-rate controller 104 is configured substantially the same as the high-side slew-rate controller 102. Specifically, in the logic-low state, the signal LS activates a first P-type switch $P_3$ to increase the low-side control signal $V_{LS}$ at a more gradual slew-rate until a comparator 126 detects that the magnitude of the low-side control signal $V_{LS}$ becomes approximately equal to or greater than the threshold voltage $V_T$ of the low-side power switch $N_2$. Thus, the comparator 126 generates a logic high signal $LS_2$ that is provided to a NAND-gate 128, along with an inverted version of the signal LS via an inverter 130. Thus, the NAND-gate 128 activates a second P-type switch $P_4$ arranged in parallel with the first switch $P_3$ to increase the low-side control signal $V_{LS}$ at the second, more rapid slew-rate. Thus, the low-side slew-rate controller 104 adjusts the rising-edge slew-rate of the low-side control signal $V_{LS}$ in substantially the same manner as the high-side slew-rate controller 102 to substantially mitigate both amplitude ringing of the voltage $V_{SW}$ and conduction losses through the low-side power switch $N_2$, as described above.

Also similar to as described above regarding the high-side slew-rate controller 102, upon the signal LS switching from a logic-low state to a logic-high state, such as in response to the signal PWM switching states, the signal LS deactivates the first switch $P_3$ and deactivates the second switch $P_4$ via the inverter 130 and the NAND-gate 128. The signal LS also activates a third N-type switch $N_4$ to couple the low-side control signal $V_{LS}$ to ground. As a result, the voltage magnitude of the low-side control signal $V_{LS}$ decreases to deactivate the low-side power switch $N_2$. Thus, upon a dead-time controller 132 selectively delaying the activation signal $ACT_{HS}$ based on the falling-edge slew-rate of the low-side control signal $V_{LS}$, similar to as described above regarding the dead-time controller 120, the high-side power switch $N_1$ can be activated.

It is to be understood that the gate driver 100 is not intended to be limited to the example of FIG. 3. As an example, each of the high-side and low-side slew-rate controllers 102 and 104 can include one or more additional P-type switches that are activated by the respective NAND-gates 116 and 128, such as to increase the second, more rapid slew-rate of the respective control signals $V_{HS}$ and $V_{LS}$. Additionally or alternatively, the second switches $P_2$ and $P_4$ can have switch characteristics that are set to achieve the desired second, more rapid slew-rate. Furthermore, the general arrangement of the circuit components in each of the slew-rate controllers 102 and 104 can vary to achieve the adjustment to the rising-edge slew-rate of the control signals $V_{HS}$ and $V_{LS}$ at each changing state of the signal PWM. Therefore, the gate driver 100 can be configured in a variety of ways.

Figure 4:
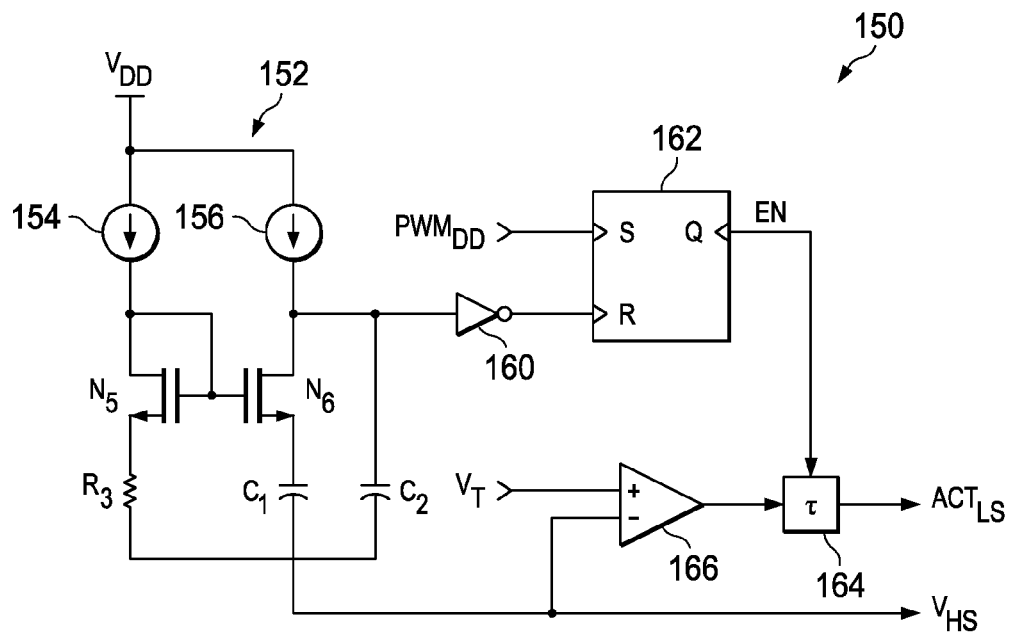
FIG. 4 illustrates an example of a dead-time controller in accordance with an aspect of the invention.

FIG. 4 illustrates an example of a dead-time controller 150 in accordance with an aspect of the invention. The dead-time controller 150 can correspond to the dead-time controller 120 in the example of FIG. 3. Thus, reference is to be made to the example of FIG. 3 in the following description of the example of FIG. 4. In addition, although the dead-time controller 120 in the example of FIG. 4 is described with reference to the high-side control signal $V_{HS}$ in the high-side slew-rate controller 102, it is to be understood that the described function of the dead-time controller 150 in the example of FIG. 4 can be equally applicable to the dead-time controller 132 in the low-side slew-rate controller 104.

The dead-time controller 150 includes a current-mirror 152 that is powered by the power voltage $V_{DD}$. The current mirror 152 includes a current source 154 that generates a current $I_1$ through a transistor $N_5$ and a resistor $R_3$ to the switching node 12. The current mirror 152 includes a current source 156 that generates a current $I_2$ through a transistor $N_6$ that is cross-coupled to the transistor $N_5$ and through a capacitor $C_1$ that interconnects the transistor $N_6$ and the high-side control signal $V_{HS}$. A capacitor $C_2$ interconnects a control node 158, arranged between the current source 156 and the drain of the transistor $N_6$, and the switching node 12. In the example of FIG. 4, the control node 158 has a voltage $V_{CTRL}$ and is provided to an inverter 160, such that the inverter 160 inverts the voltage $V_{CTRL}$ at an "R" input of an SR-latch 162. The SR-latch 162 also receives the signal $PWM_{DD}$ at an "S" input and generates an enable signal EN at an output.

As described above regarding the dead-time controller 120, the dead-time controller 150 is configured to detect the falling-edge slew-rate of the high-side control signal $V_{HS}$. Specifically, in the example of FIG. 4, the falling-edge slew-rate of the high-side control signal $V_{HS}$ determines how much the magnitude of the voltage $V_{CTRL}$ decreases based on the capacitance (dV/dt) characteristics of the capacitor $C_1$. In the example of FIG. 4, upon the signal $PWM_{DD}$ switching to a logic-high state, such that the gate driver 100 indicates deactivation of the high-side power switch $N_1$ and activation of the low-side power switch $N_2$, the enable signal EN is set to a logic-high state to enable a time-delay element 164. Also in response to signal $PWM_{DD}$ switching to the logic-high state, the high-side slew-rate controller 102 activates the third switch $N_3$ to begin decreasing the high-side control signal $V_{HS}$.

If the falling-edge slew-rate of the high-side control signal $V_{HS}$ is rapid, then the rapid decrease in magnitude of the high-side control signal $V_{HS}$ will also rapidly decrease the magnitude of the control voltage $V_{CTRL}$. Specifically, based on the capacitance characteristics of the capacitor $C_1$, the magnitude of the control voltage $V_{CTRL}$ can decrease faster than the current source $I_2$ can rebuild charge within the capacitor $C_1$ to maintain the magnitude of the control voltage $V_{CTRL}$. As a result, the magnitude of the control voltage $V_{CTRL}$ can decrease less than the inversion threshold of the inverter 160. Thus, the inverter 160 provides a logic-high output to the "R" input of the SR-latch 162, thus setting the enable signal EN to a logic-low output to disable the time-delay element 164.

If the falling-edge slew-rate of the high-side control signal $V_{HS}$ is slow, then the more gradual decrease in magnitude of the high-side control signal $V_{HS}$ may only decrease the magnitude of the control voltage $V_{CTRL}$ by a magnitude that is insufficient to achieve the inversion threshold of the inverter 160. As a result, the inverter 160 does not change state, and thus does not switch the logic state of the enable signal EN to a logic-low output. Accordingly, the time-delay element 164 remains enabled.

The dead-time controller 150 includes a comparator 166 that monitors the magnitude of the high-side control signal $V_{HS}$. Thus, upon the high-side control signal $V_{HS}$ decreasing less than the threshold voltage $V_T$ of the high-side power switch $N_1$, the comparator provides the activation signal $ACT_{LS}$ to signify activation of the low-side power switch $N_2$. If the dead-time controller 150 detected that the falling-edge slew-rate of the high-side control signal $V_{HS}$ was rapid, such that the time-delay element 164 is disabled, the activation signal $ACT_{LS}$ is not delayed. Therefore, the low-side power switch $N_2$ is commanded to be activated more quickly. However, if the dead-time controller 150 detected that the falling-edge slew-rate of the high-side control signal $V_{HS}$ was more gradual, such that the time-delay element 164 is enabled, the activation signal $ACT_{LS}$ is delayed. Therefore, the activation of the low-side power switch $N_2$ is likewise delayed to substantially mitigate a shoot-through condition.

Accordingly, the dead-time controller 150 can optimize the dead-time between deactivation of the high-side power switch $N_1$ and activation of the low-side power switch $N_2$. Specifically, by detecting the falling-edge slew-rate of the high-side control signal $V_{HS}$, the dead-time controller 150 can substantially ensure a minimum dead-time to optimize switching efficiency of the power switches $N_1$ and $N_2$ in generating the output voltage while substantially mitigating a shoot-through condition.

It is to be understood that the dead-time controller 150 can include additional circuit components and/or a variable configuration in order to detect the falling-edge slew-rate of the high-side control signal $V_{HS}$ and the resultant adjustment to the dead-time. As an example, the dead-time controller 150 can include more than one time-delay element, with each being controlled by a separate mirrored-current element coupled to the high-side control signal $V_{HS}$, with each mirrored-current element having a separate capacitor with a distinct capacitance value, and separate SR-latch. As a result, the amount of dead-time can be variable based on the number of time-delay elements are selectively enabled in response to the falling-edge slew-rate of the high-side control signal $V_{HS}$. Therefore, the dead-time controller 150 can be configured in any of a variety of ways.

Figure 5:
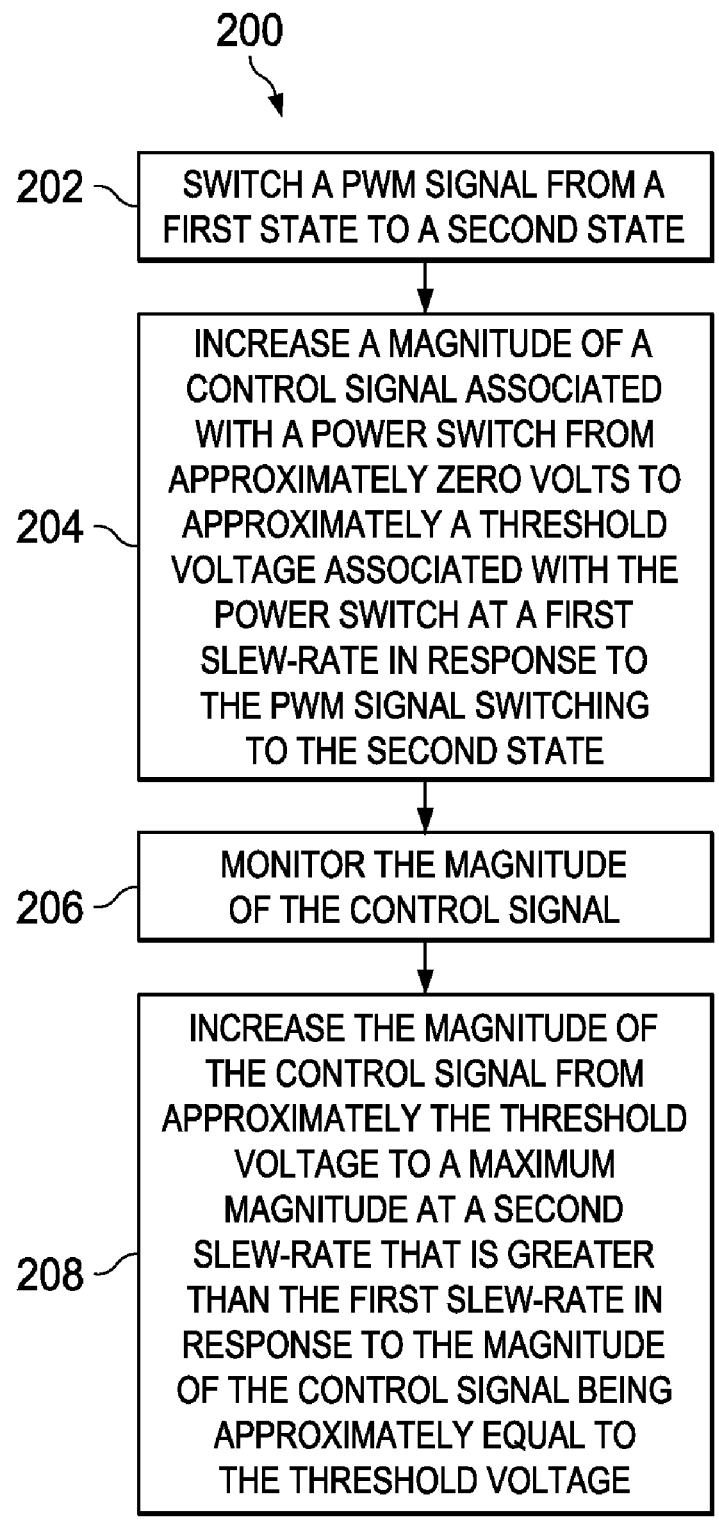
FIG. 5 illustrates an example of a method for controlling a power switch in accordance with an aspect of the invention.

In view of the foregoing structural and functional features described above, a methodology in accordance with various aspects of the invention will be better appreciated with reference to FIG. 5. While, for purposes of simplicity of explanation, the methodology of FIG. 5 is shown and described as executing serially, it is to be understood and appreciated that the invention is not limited by the illustrated order, as some aspects could, in accordance with the invention, occur in different orders and/or concurrently with other aspects from that shown and described herein. Moreover, not all illustrated features may be required to implement a methodology in accordance with an aspect of the invention.

FIG. 5 illustrates an example of a method 200 for controlling a power switch in a power supply system in accordance with an aspect of the invention. The power switch can be a high-side or a low-side power FET. At 202, a PWM signal is switched from a first state to a second state. The PWM signal can be generated based on a comparison of a feedback voltage with a reference voltage via an error amplifier, with a resulting error voltage being compared with a ramp signal. At 204, a magnitude of a control signal associated with the power switch is increased from approximately zero volts to approximately a threshold voltage associated with the power switch at a first slew-rate in response to the PWM signal switching to the second state. The first slew-rate can be set based on activating a first switch to couple the control signal to a power voltage.

At 206, the magnitude of the control signal is monitored. The control signal can be input to a comparator that compares the magnitude of the control signal to a threshold voltage of the power switch. At 208, the magnitude of the control signal is increased from approximately the threshold voltage to a maximum magnitude at a second slew-rate that is greater than the first slew-rate in response to the magnitude of the control signal being approximately equal to the threshold voltage. The second-slew-rate can be set by activated a second or more additional switches configured in parallel with the first switch. Therefore, the adjusted slew-rate can substantially mitigate both amplitude ringing at an associated switching node and conduction losses through the power switch.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power supply system comprising:
    at least one power switch configured to be activated and deactivated based on a duty-cycle of a respective at least one control signal to generate an output voltage; and
    a gate driver configured to generate the at least one control signal and to adjust a slew-rate of each pulse of the at least one control signal to substantially mitigate amplitude ringing at a switching node during a first rising-edge portion and to substantially mitigate conduction losses associated with the at least one power switch during activation and deactivation of the at least one power switch during a second rising-edge portion.

2. The system of claim 1, wherein the at least one switch comprises a high-side switch and a low-side switch that are each coupled to the switching node and controlled by a respective high-side control signal and low-side control signal, wherein the gate driver is further configured to detect a falling-edge slew-rate of each pulse of the high-side and low-side control signals to control a dead-time between deactivation of one of the high-side and low-side switches and activation of the other of the high-side and low-side switches.

3. The system of claim 1, wherein the gate driver is configured to increase an amplitude of the at least one control signal from approximately zero volts to approximately a threshold voltage associated with the at least one power switch at a first slew-rate, and to increase the amplitude of the at least one control signal from approximately the threshold voltage to a maximum magnitude at a second slew-rate that is greater than the first slew-rate.

4. The system of claim 1, wherein the gate driver is configured to generate the at least one control signal in response to a pulse-width modulation (PWM) signal having a first state corresponding to activation of the at least one power switch and a second state corresponding to deactivation of the at least one power switch, and wherein the gate driver comprises at least one slew-rate controller.

5. The system of claim 4, wherein, in the first state of the PWM signal, the gate driver is configured to activate a first switch of the slew-rate controller to couple the at least one control signal to a power voltage and to activate a second switch of the slew-rate controller arranged in parallel with the first switch in response to the at least one control signal having a magnitude that is approximately equal to a threshold voltage associated with the at least one power switch.

6. The system of claim 5, wherein, in the second state of the PWM signal, the gate driver is configured to deactivate the first switch and the second switch and to activate a third switch to couple the at least one control signal to one of the switching node and a low-voltage rail.

7. The system of claim 4, wherein the at least one switch comprises a high-side switch and a low-side switch that are each coupled to the switching node and controlled by a respective high-side control signal and low-side control signal, and wherein the at least one slew-rate controller comprises a first dead-time controller and a second dead-time controller, the first and second dead-time controllers being configured to control a dead-time between deactivation of one of the high-side and low-side switches and activation of the other of the high-side and low-side switches.

8. The system of claim 7, wherein each of the first and second dead-time controllers comprises at least one delay element that is configured to selectively provide delay between the deactivation of the one of the high-side and low-side switches and activation of the other of the high-side and low-side switches in response to detecting a falling-edge slew-rate of each pulse of the high-side and low-side control signals.

9. The system of claim 8, wherein each of the first and second dead-time controllers comprises a latch and a current mirror having a capacitor that interconnects a control node and one of the high-side and low-side control signals, the latch having a first input that enables the at least one delay element in response to one of the first and second states of the PWM signal and having a second input that is coupled to the control node and which disables the at least one delay element in response to the magnitude of the one of the high-side and low-side control signals decreasing rapidly enough to decrease a voltage magnitude of the control node to below a threshold via the capacitor.

10. The system of claim 1, wherein the gate driver is configured as an integrated circuit.

11. A method for activating a power switch in a power supply system, the method comprising:
switching a pulse-width modulation (PWM) signal from a first state to a second state;
increasing a magnitude of a control signal associated with the power switch from approximately zero volts to approximately a threshold voltage associated with the power switch at a first slew-rate in response to the PWM signal switching to the second state;
monitoring the magnitude of the control signal; and
increasing the magnitude of the control signal from approximately the threshold voltage to a maximum magnitude at a second slew-rate that is greater than the first slew-rate in response to the magnitude of the control signal being approximately equal to the threshold voltage.

12. The method of claim 11, wherein the power switch is a first power switch and the control signal is a first control signal, the method further comprising:
switching the PWM signal from the second state to the first state;
decreasing the magnitude of the first control signal to approximately zero volts;
increasing a magnitude of a second control signal associated with a second power switch from approximately zero volts to a threshold voltage associated with the second power switch at the first slew-rate;
monitoring the magnitude of the second control signal; and
increasing the magnitude of the second control signal from approximately the threshold voltage to a maximum magnitude at the second slew-rate in response to the magnitude of the second control signal being approximately equal to the threshold voltage associated with the second power switch.

13. The method of claim 12, further comprising:
detecting a falling-edge slew-rate of the first control signal;
selectively delaying an activation signal associated with increasing the magnitude of the second control signal at the first slew-rate based on the detected slew-rate.

14. The method of claim 13, wherein selectively delaying the activation signal comprises selectively enabling at least one time delay element in response to the magnitude of the first control signal decreasing rapidly enough to decrease a voltage magnitude of a control node coupled to an input of a latch to below a threshold via a capacitor.

15. The method of claim 11, wherein increasing the magnitude of the control signal at the first slew-rate comprises activating a first switch to couple the control signal to a power voltage, and wherein increasing the magnitude of the control signal at the second slew-rate comprises activating a second switch that is arranged in parallel with the first switch.

16. The method of claim 15, further comprising:
switching the PWM signal from the second state to the first state;
deactivate the first switch and the second switch in response to the PWM signal switching to the first state; and
activating a third switch to couple the control signal to one of a switching node associated with the power supply system and a low-voltage rail.

17. A power supply system comprising:
a high-side power switch interconnecting an input voltage and a switching node;
a low-side power switch interconnecting the switching node and a low voltage rail; and
a gate driver configured to generate a high-side control signal configured to activate and deactivate the high-side switch and a low-side control signal configured to activate and deactivate the low-side switch in response to a pulse-width modulation (PWM) signal to generate an output voltage, the gate driver also being configured to adjust a dead-time between deactivation of one of the high-side and low-side power switches and activation of the other of the high-side and low-side power switches based on a detected falling-edge slew-rate of each pulse of the high-side and low-side control signals.

18. The system of claim 17, wherein the gate driver comprises:
a high-side slew-rate controller configured to adjust a slew-rate of each rising-edge of the high-side control signal; and
a low-side slew-rate controller configured to adjust a slew-rate of each rising-edge of the low-side control signal.

19. The system of claim 18, wherein the high-side and low-side slew-rate controllers are configured to increase an amplitude of the respective high-side and low-side control signals from approximately zero volts to approximately a threshold voltage associated with the respective high-side and low-side power switches at a first slew-rate, and to increase the amplitude of the respective high-side and low-side control signals from approximately the threshold voltage to a maximum magnitude at a second slew-rate that is greater than the first slew-rate in response to respective first and second states of the PWM signal.

20. The system of claim 17, wherein each of the high-side and low-side slew-rate controllers comprise:

a first switch that is activated in response to a first state of the PWM signal to couple a respective one of the high-side and low-side control signals to a power voltage; and a second switch arranged in parallel with the first switch that is activated in response to the at least one control signal having a magnitude that is approximately equal to a threshold voltage associated with the respective one of the high-side and low-side power switches.

* * * * *